(12) United States Patent
Zmaj

(10) Patent No.: US 7,604,111 B2
(45) Date of Patent: Oct. 20, 2009

(54) MODULAR ENDLESS CONVEYOR BELT

(75) Inventor: Petrovic Zmaj, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 0 days.

(21) Appl. No.: 11/914,303

(22) PCT Filed: May 12, 2006

(86) PCT No.: PCT/FR2006/001062

§ 371 (c)(1),
(2), (4) Date: Nov. 13, 2007

(87) PCT Pub. No.: WO2006/120354

PCT Pub. Date: Nov. 16, 2006

(65) Prior Publication Data

US 2008/0190742 A1   Aug. 14, 2008

(30) Foreign Application Priority Data

May 13, 2005   (FR) .................................. 05 04824

(51) Int. Cl.
*B65G 17/06* (2006.01)
(52) U.S. Cl. ...................... 198/831; 198/852
(58) Field of Classification Search ................ 198/831, 198/851, 852, 853
See application file for complete search history.

(56) References Cited

U.S. PATENT DOCUMENTS

| | | | |
|---|---|---|---|
| 2,256,005 A | 9/1941 | Wood | |
| 3,094,206 A | 6/1963 | Stewart et al. | |
| 6,129,202 A | 10/2000 | Layne et al. | |
| 6,298,982 B1 * | 10/2001 | Layne et al. | 198/831 |
| 6,386,355 B1 | 5/2002 | Willems | |
| 6,471,046 B2 * | 10/2002 | Layne et al. | 198/831 |
| 6,578,704 B1 * | 6/2003 | MacLachlan | 198/778 |
| 7,303,066 B2 * | 12/2007 | Rumer | 198/831 |

FOREIGN PATENT DOCUMENTS

EP   0 480 863 A1   4/1992

\* cited by examiner

*Primary Examiner*—Douglas A Hess
(74) *Attorney, Agent, or Firm*—Sughrue Mion, PLLC

(57) ABSTRACT

The modular endless conveyor belt includes a structure provided with guides to support the upper run of the belt, a curvilinear guide mechanism and a stabilization mechanism for the belt with relation to the perpendicular in curved trajectory sections. The curvilinear guide mechanism is made up of rollers regularly distributed on the structure, cooperating with lugs arranged on the internal surface of the belt. The lugs include a shoulder for stabilizing the belt. The guide has the form of a rail, arranged below the rollers, cooperating with a shoulder on each lug to counteract the vertical movements to which the belt is subjected as a function of the load being transported. The rail arranged below the rollers has the form of a thin metal sheet in a circular arc and the sheet is housed in a rebate provided in the support structure for the upper run of the belt.

16 Claims, 3 Drawing Sheets

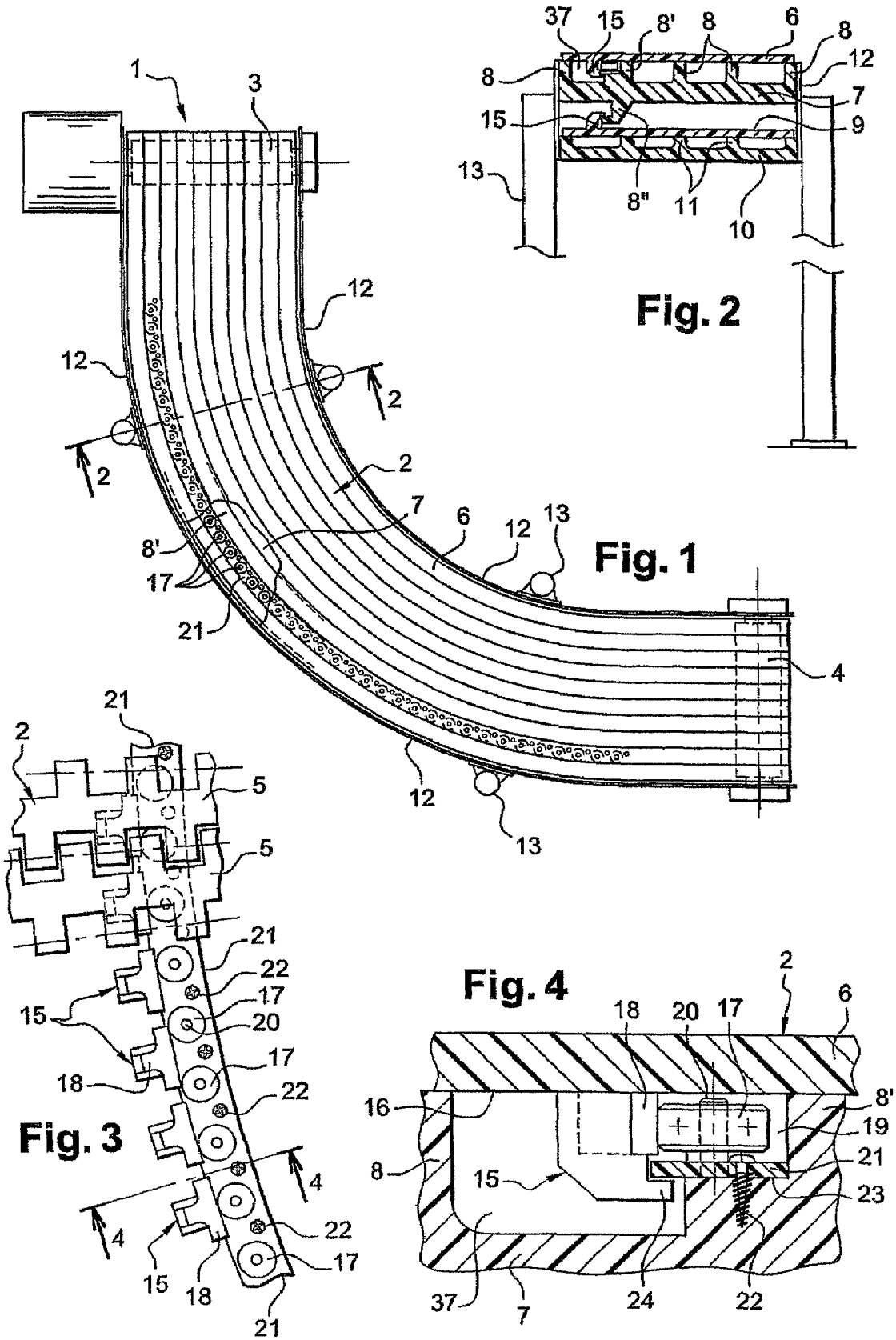

MODULAR ENDLESS CONVEYOR BELT

BACKGROUND OF THE INVENTION

1. Field of the Invention

The present invention relates to a modular endless belt conveyor device provided with means for guiding said belt in the curved path portions.

2. Description of the Related Art

This type of belt, generally made of thermoplastic, as described in document U.S. Pat. No. 5,573,105, may comprise intrinsic means which allows its guidance to be improved, in particular at the curved portions of the conveyor. In fact, the key concern is to reduce the friction between the belt and its supporting structure and, as far as possible, to overcome the consequences of such friction which can vary to significant degrees depending on the magnitude of the load carried along by the upper strand of said belt.

The consequences of such friction are many. First of all, there is the heating between the moving parts, that is to say the belt and the fixed parts formed by the various elements of the supporting structure of said belt; there is also the wear on the belt, which is made of thermoplastic, and another significant consequence is the instability of said belt. Specifically, under the effect of the load and the tension, the belt may tend to rise at its outer periphery when negotiating the curves.

There are solutions for reducing the friction between the belt and the structure of the conveyor. As described in the aforementioned document, the belt may include rollers which are mounted so as to project from its inner surface, and these rollers are arranged over the whole length of the belt, being fastened by suitable means, so as to cooperate with a curved guide situated at each curved part of said conveyor.

In addition to their specific function associated with the curvilinear guidance of the belt, the rollers can also stabilize the belt against the risks of the upper strand rising in the curved portions of the conveyor.

To perform this belt-stabilizing function, the rollers disclosed in the aforementioned document cooperate with an arrangement of the fixed curved guide, which arrangement takes the form of a continuous rim which is arranged so as to project with respect to the active running surface of said guide, which rim extends between said rollers and the inner surface of the belt.

In another embodiment, this function of stabilizing the upper strand of the belt in the curved parts of the conveyor is provided by means of a curved guide which is arranged at the outer periphery of said curved parts, and this guide cooperates with protuberances in the form of an angle bracket, or hook, which are arranged so as to project from the inner surface of the peripheral rim of said belt.

There also exists, as described in document U.S. Pat. No. 3,094,206, other types of conveyor belts, non-modular ones, which have rollers cooperating with a guide in the curved parts. In that document, rollers are also arranged directly on the curved frame in order to reduce friction and improve guidance.

In document U.S. Pat. No. 6,129,202, the conveyor belt does not have rollers but protuberances arranged so as to project from its inner surface, and these protuberances cooperate with rollers which are arranged only on what acts as a frame in the curved part of the conveyor. These rollers make it possible to reduce the friction and they additionally have a groove which cooperates with a kind of lug arranged at the lower part of each protuberance so as to stabilize the belt and keep it flat.

BRIEF SUMMARY OF THE INVENTION

The present invention provides an arrangement which makes it possible in a relatively simple manner to deal with these problems of curvilinear guidance and stabilization of the modular belts in the curved portions of the conveyors.

The conveyor device according to the invention comprises a structure, or frame, for supporting and guiding the upper and lower strands of said belt in the curved path portions and, in particular, curvilinear guide means and stabilizing means for the upper strand, which means are, on the one hand, made up of rollers which are secured to said supporting structure of said upper strand and, on the other hand, made up of cleats which are arranged on the inner surface of said belt, which cleats are arranged to run on said rollers, and they comprise, at their end, a claw which cooperates with means suitable for stabilizing said upper strand, which stabilizing means are made up of a rail which is arranged directly below said rollers so as to cooperate with said claw of each cleat, in such a way as to achieve with said cleats both a curvilinear guidance of the upper strand of the belt by means of the rollers and the stabilization of said upper strand, but in a continuous manner, by means of said rail.

This original constructional arrangement makes it possible to use rollers in the form of a simple inexpensive ball-type bearing.

Still according to the invention, the supporting structure of the upper strand of the belt is made up of a baseplate produced in the form of a circular ring portion from a sheet of thermoplastic, which baseplate has an indentation which is arranged as a curve in its thickness, in the vicinity of its outer rim, which indentation is made up of a groove for the passage of the cleats and of a rebate for housing the rollers and the rail for stabilizing said upper strand of the belt.

According to another arrangement of the invention, the rail for stabilizing the belt takes the form of a thin metal strip which, like the baseplate, is configured as an arc of a circle, which rail is arranged and fastened in the rebate of said baseplate, and its outer rim, which serves as a guide for the claw of each cleat, projects into the groove in which these cleats travel.

According to a first embodiment of the invention, the stabilizing rail comprises pins on which the various rollers are force-fitted, said rail itself being fastened by screws or other means into the rebate of the baseplate supporting the upper strand of the belt.

According to a variant embodiment of the invention, the rebate of the baseplate supporting the belt has orifices for accommodating and locking the pin of each roller, which pin comprises, on the one hand, a bulge at its lower end for allowing it to be locked with respect to said baseplate by force-fitting in the thickness of this baseplate and, on the other hand, a shoulder situated below the roller, which shoulder locks the stabilizing rail in the bottom of said rebate, which rail has, opposite said orifices, oblong holes whose dimensions allow, in particular, for the different coefficients of expansion which exist between said rail and said baseplate.

Still according to the invention, each cleat takes the form of a protrusion molded, in an integral manner, on the inner surface of the belt, which protrusion comprises, on the one hand, a housing for accommodating an add-on part in the form of a runner made of a material suitable for contact with the rollers and, on the other hand, beyond said housing, an arrangement in the form of an angle bracket whose terminal branch forms a kind of claw which cooperates with the stabilizing rail so as to counter the vertical stresses to which said belt is subjected according to the load which it transports.

The invention thus makes it possible to concentrate in a single suitable place all the means which make it possible to solve the problems associated with guiding and stabilizing the belt in the curved portions of the conveyors.

According to another arrangement of the invention, the center-to-center distance between two adjacent rollers is between 0.5 and 1.5 times the spacing which is present between two consecutive cleats of the belt; this center-to-center distance is chosen according to the stresses to which the belt is subjected; it may also be relatively large owing to the particular nature of some types of modular belts which, in the curves, form a relatively rigid structure, which is stiffened by the friction between the various links.

Still according to the invention, the runner has a running wall of trapezoidal shape whose height corresponds at least to the height of the rollers and whose length is around ¾ of the spacing which is present between two consecutive cleats of the belt.

According to another arrangement of the invention, the runner has, behind the running wall, a protrusion in the form of a stub which fits into a suitable housing arranged in the cleat, which stub is provided with means which enable it to be locked with respect to said cleat such as, for example, a lug in the form of a truncated cylinder which cooperates with an orifice formed in one of the partitions of said cleat.

Still according to the invention, the partition of the cleat which allows the stub of the runner to be locked extends between two flanks of said cleat, which flanks are perpendicular to the belt and to its direction of movement, which partition is prolonged beyond the trapezoidal wall of said runner, in the form of an angle bracket which is terminated by the stabilizing claw of said belt.

The invention also relates, by way of industrial product, to the supporting structure of the belt upper strand that may or may not be equipped with the rollers and the stabilizing rail.

BRIEF DESCRIPTION OF THE SEVERAL VIEWS OF THE DRAWINGS

However, the invention will be described in further detail with the aid of the description below and the appended drawings which are given by way of illustration and in which:

FIG. 1 represents, schematically, a curved conveyor with an endless belt of the modular type of which a part is cut away to show the guiding system;

FIG. 2 is a schematic section on 2-2 in FIG. 1;

FIG. 3 shows, in a more detailed manner, a portion of the modular belt and the rail which is provided with the rollers;

FIG. 4 is a section on 4-4 in FIG. 3 showing, schematically and in a more detailed manner, the arrangement of the means for guiding and stabilizing the belt according to a first embodiment of the invention;

DETAILED DESCRIPTION OF NON-LIMITING EMBODIMENTS OF THE INVENTION

Figure 5:
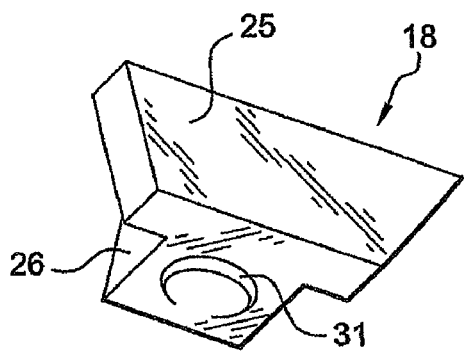
FIG. 5 represents, in perspective and more particularly viewed from below, a runner according to the invention.

The conveyor (1) represented in FIG. 1, in plan, comprises an endless belt (2) which is tensioned between drums (3) and (4), one of which is motor-driven. This endless belt is of the modular type; as can be seen from FIG. 3, it is made up of thermo-plastic elements (5) which are assembled together, which elements are able to move angularly with respect to one another so as to curve said belt (2).

As represented, this conveyor has a belt (2) which travels along rectilinear portions and, between these two portions, a curved portion. This type of belt may also be used for conveyors of considerable length, with a number of curved path portions oriented in the same direction.

Guiding the belt in the rectilinear path portions does not present any particular problem. In the curved portions, it is necessary to guide the belt so as to obtain a regular radius of curvature and to stabilize it so as to prevent any risk of the belt rising under the effect of the vertical forces which may arise when it is loaded.

The upper strand (6) of the belt (2), FIG. 2, rests on a supporting structure in the form of a baseplate (7) which forms part of the general structure, or frame, of the conveyor. This baseplate (7) is produced from a thermoplastic; it is arranged in a curve and can include guides (8) which are curved as well and serve as supports for the inner surface (lower surface) of the upper strand (6) of the belt.

The lower strand (9), or return strand, of the belt (2) is supported and guided, for its part too, by a lower baseplate (10), of the same type as the baseplate (7), which is provided, in the same way, with guides (11) serving as supports.

Figure 11:
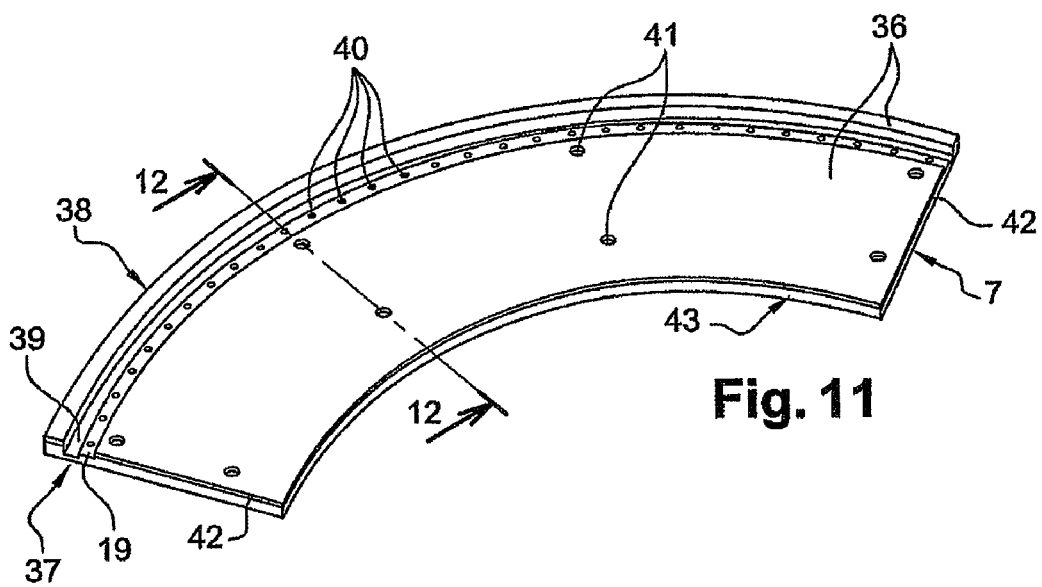
FIG. 11 shows an embodiment of the baseplate supporting the upper strand of the belt, which baseplate is represented alone, that is to say without the means for guiding and stabilizing the belt.
Figure 12:
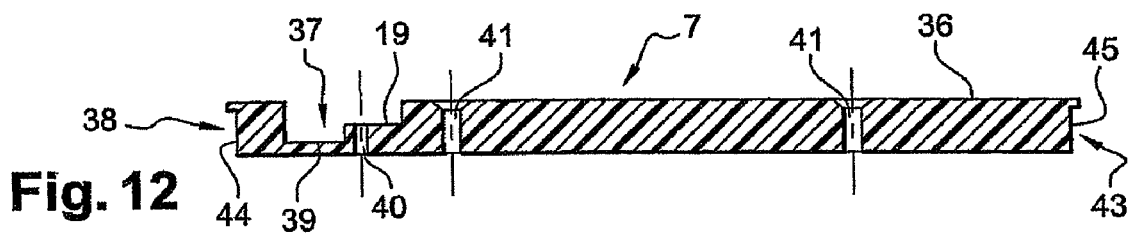
FIG. 12 is a cross section on 12-12 of the supporting baseplate which is represented in FIG. 11.
Figure 13:
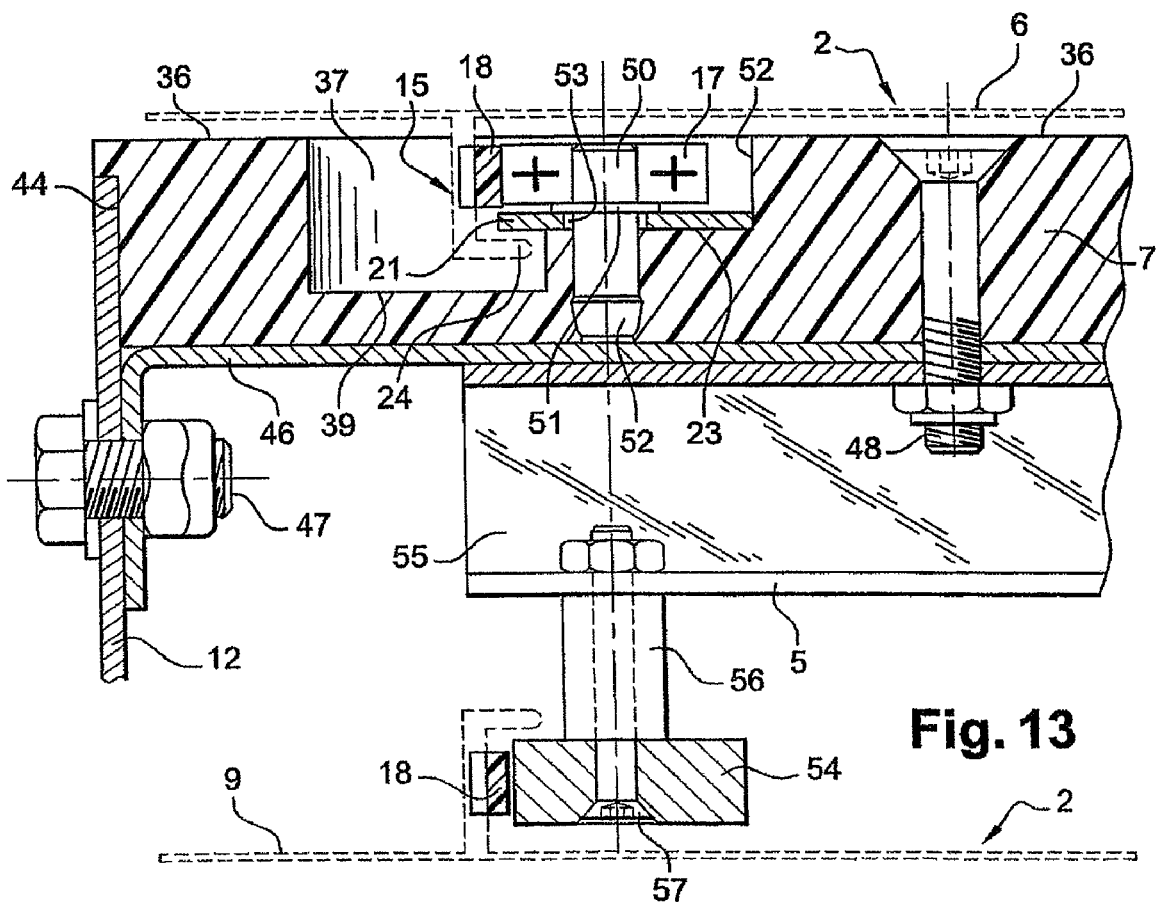
FIG. 13 represents, in a detailed manner and in section, another embodiment of the means for guiding the belt, in connection with the baseplate represented in FIGS. 11 and 12.

The radius of curvature of the baseplate (7) is tailored to the deformation capacity of the belt, and this baseplate (7) comprises suitable guide means which appear in FIGS. 1 to 4 in the case of a first embodiment and in FIGS. 11 to 13 in the case of a second embodiment.

The two baseplates (7) and (10) are assembled together by flanks (12) and the assembly forms the structure, or frame, of the conveyor; these flanks (12) are, for example, made up of metal sheets on which are also fastened the posts (13) which serve to support said frame.

The curvilinear guidance of the belt (2) is achieved by means of cleats (15) which are arranged on the inner face (16) of said belt, also visible in FIG. 4, and, in the case of the upper strand (6), by means of a curved guide (8') arranged on the baseplate (7), which guide (8') also acts as a support guide in the same capacity as the other guides (8). This support guide (8') is situated in the vicinity of the periphery of the baseplate (7); this guide (8') corresponds, for example, to the second support guide starting from the outside of the conveyor; hence, the cleats (15) travel in the space which extends between the two guides (8 and 8') which are situated on the outer periphery of said conveyor.

Another guide (8") is arranged below the baseplate (7) in order to guide the lower strand (9) of the belt; this second guide (8") cooperates with the cleats (15) of said return strand of the belt (2) which travels on the lower baseplate (10).

To obtain a friction-free curvilinear guidance for the upper strand (6) of the belt, the cleats (15) in fact travel on a specific guide member which particularly comprises rollers (17). These rollers (17), visible in FIG. 4, are preferably simple ball bearings, and they are in contact with runners (18) which are supported by the cleats (15). These runners (18) are secured to the cleats (15) as detailed below in connection with FIGS. 5 to 10; they are made of thermoplastic, like the belt (2) and its cleats (15), but of different, more elastic thermoplastic so as to better withstand the pressure during contact with the rollers (17).

The rollers (17) are arranged in a rebate (19) which is formed in the outer upper part of the guide (8'), FIG. 4; they are each mounted on a pin (20) which is vertical, perpendicular to the inner surface (16) of the belt (2), and these pins, in this first embodiment, are secured to a rail (21) which is fastened by means of screws (22), for example, to the bottom (23) of the rebate (19).

The curvilinear guide member, made up of the rail (21), the rollers (17) and the pins (20), forms a separate part which can easily be adapted to this type of conveyor. The rebate mounting makes it possible to position the rollers (17) and the rail (28) with a high degree of precision and thus obtain uniform belt guidance.

The rail (21) is, for example, made up of a thin metal strip produced as an arc of a circle; the width of this thin strip is substantially greater than the diameter of the rollers (17). The pins (20) of the rollers are welded to this strip, perpendicularly. The rollers (17) are simply slipped over the pins (20) and slightly clamped so that they can be easily changed in the event of damage, for example.

The width of the strip constituting the rail (21) is greater than the width of the bottom (23) of the rebate (19), thus making it possible to use the projecting part of this rail (21) to produce the vertical stabilization of the belt, that is to say to keep it flat irrespective of the load carried by the upper strand (6) of said belt.

This stabilization is obtained by an arrangement of the end of the cleat (15), which end is in the form of an angle bracket and its horizontal end branch forms a kind of claw (24). This claw (24) cooperates with the underside of the rail (21) and, in particular, with its projecting part which extends outside the shoulder (23) of the guide (8').

All the means for guiding and stabilizing the belt are concentrated on the rail (21) which bears the rollers (17), in cooperation with the cleat (15) which bears the runner (18) and the claw (24). The maintenance operations for this assembly are greatly facilitated as a result, also due to the particular way of mounting the runners (18) on the cleats (15).

The cleats (15) cooperate in the same manner with the guide (8"), as represented in FIG. 2; this guide (8") makes it possible to provide guidance for the lower strand (9) of the belt.

A runner (18) is represented in FIG. 5, in perspective. This runner is made up of a wall (25) of trapezoidal shape; this wall (25) runs on the various rollers (17); its trapezoidal shape allows a smooth strike against said rollers (17) and a smooth departure therefrom.

The back of the wall (25) comprises, in an integral manner, a stub (26) which cooperates with a housing (27) formed in the cleat (15). This housing (27) is defined by the inner surface (16) of the belt (2), by flanks (28) which are mutually parallel and which extend perpendicularly to said surface (16) and to the direction of forward travel of the belt (2), and by a partition (29) which connects said flanks and which is parallel to said inner surface (16). This partition (29) has an orifice (30) which accommodates a lug (31) arranged on the stub (26), below the surface which extends the small side of the trapezoidal wall (25) of the runner (18).

Figure 7:
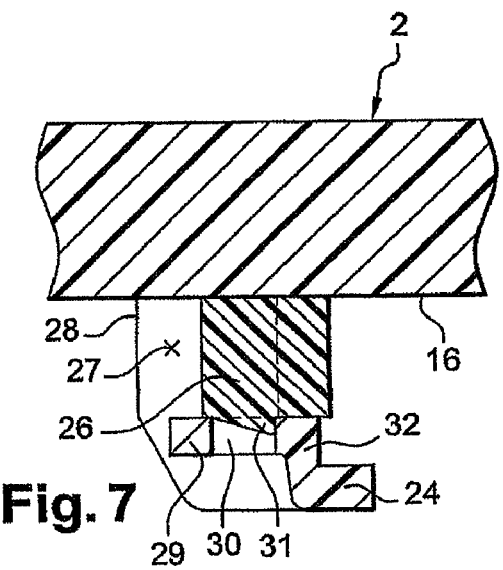
FIG. 7 is a section on 7-7 in FIG. 6 which shows the cleat below the inner surface of the belt and the runner incorporated into said cleat.
Figure 8:
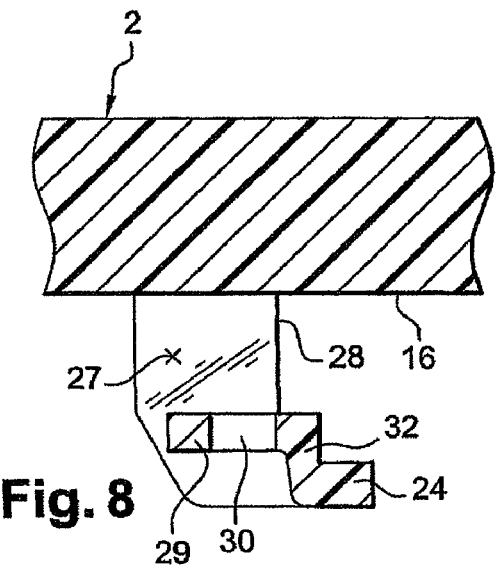
FIG. 8 is a view corresponding to FIG. 7 but without the runner.
Figure 9:
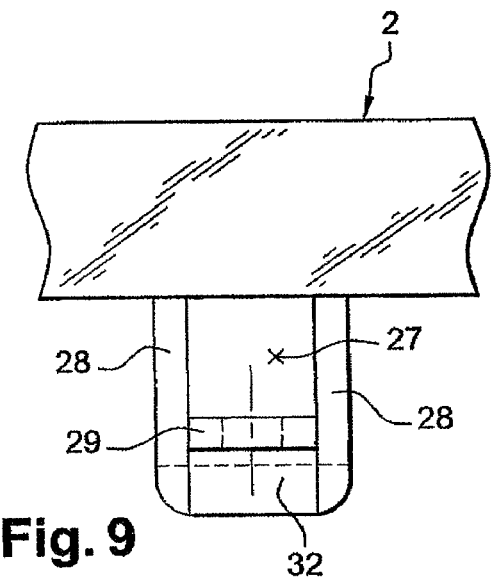
FIG. 9 is a back view of the cleat alone.
Figure 10:
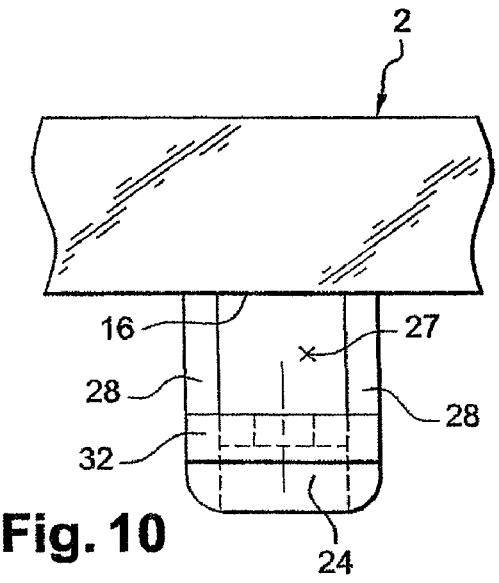
FIG. 10 is a front view of the cleat alone.

The lug (31) makes it possible to lock the runner (18) in the housing (27) of the cleat (15) with the possibility of removal in order to change said runner in the event of wear or damage. This lug (31) takes the form of a truncated cylinder portion, as shown in FIGS. 5 and 7.

The trapezoidal wall (25) of the runner (18) bears on the front face of the flanks (28) of the cleat (15); its long side is situated below the inner face (16) of the belt (2).

Figure 6:
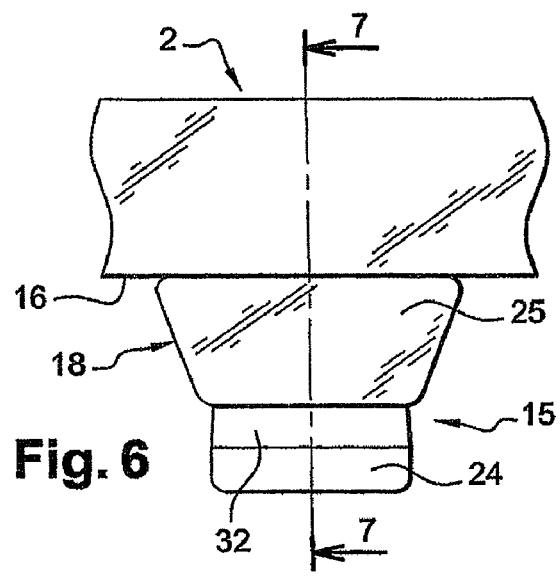
FIG. 6 represents, in a front view, that is to say as seen from the side of the rollers, the belt with a cleat and the runner installed on said cleat.

Below this wall (25), FIGS. 6 and 7, and in particular below its short side, can be found the extension in the form of an angle bracket that leads to the claw (24). This claw (24), arranged at the end of the cleat (15), projects beyond the runner (18); it is offset with respect to the partition (29) and it is connected thereto by a branch (32) which extends below said short side of the wall (25) in such a way as to help secure said wall.

The branch (32) is arranged square with respect to the partition (29) and it is slightly set back from the running surface of the wall (25) of the runner (18) so as to prevent contact with the rail (21) whose peripheral rim is situated substantially in vertical alignment with the region of the runners (18) that runs on the rollers (17).

The rail (21) constitutes a kind of accessory or detached part. It can also be provided in the form of a one-piece part for a quarter-curve conveyor or be divided into a number of sections which are assembled, as required, in the rebate (19) specially arranged to accommodate them.

FIG. 11 shows an original embodiment of the baseplate (7), which acts as a supporting structure for the upper strand (6) of the belt (2).

This baseplate (7) takes the form of a portion (a quarter) of a circular ring; it is produced, by simple machining, from a thin thermoplastic sheet; its upper surface (36) acts as a sliding surface for the upper strand (6) of the belt (2). It comprises an indentation (37) in the form of an arc of a circle that is formed in its thickness and in the surface (36).

This indentation (37), also indicated by way of illustration in FIGS. 2 and 4, is situated close to the outer flank (38) of the baseplate (7), at a distance from this flank which corresponds, for example, to the thickness of the sheet constituting said baseplate (7). It forms both a kind of groove (39) and rebate (19); said groove (39) being arranged between the outer peripheral upper surface (36) and said rebate (19).

As detailed below, the groove (39) allows, in particular, the passage of the cleats (15) of the belt (2), and, as for the embodiment detailed above, the rebate (19) allows the installation of the means for guiding and stabilizing the upper strand (6) of said belt (2).

The rebate (19) has orifices (40), which are uniformly distributed, for accommodating the pins of the rollers (17).

The baseplate (7) has, as detailed below in connection with FIG. 13, orifices (41) which allow it to be fastened to the elements constituting the frame of the conveyor. These orifices (41) are arranged in pairs, radially.

The baseplate (7) has chamfers (42) on each of its ends so as to facilitate sliding of the belt (2) at the connections between the various elements constituting the conveyor.

FIG. 12 is a more detailed view showing the baseplate (7) in radial section. Again there can be seen the indentation (37) made up, on the one hand, of the groove (39) and, on the other hand, of the rebate (19), which rebate (19) has the orifices (40) for accommodating the pins of the rollers (17). These orifices (40) are perpendicular to the sliding surface (36) of the baseplate (7). Again there can also be seen the orifices (41) for fastening the baseplate (7) to the frame of the conveyor.

The outer flank (38) and inner flank (43) of the baseplate (7) each comprise a respective rebate (44) and (45); these rebates cooperate with the flanks (12) which form part of the frame of the conveyor. The depth of the rebates (44) and (45) corresponds to the thickness of these flanks (12).

FIG. 13 shows, in section, an embodiment of the conveyor comprising the baseplate (7). This conveyor is made up of a frame which comprises the flanks (12), which flanks are interconnected by crossmembers (46) and they are fastened to these crossmembers by means of bolts (47).

The crossmembers (46) also serve as a support for the supporting structure made up of the baseplate (7). This baseplate (7) is fastened to the various crossmembers by means of bolts (48) arranged in the various orifices (41) in said baseplate (7).

The belt (2) is represented symbolically in FIG. 13. Its upper strand (6) slides on the upper surface (36) of the baseplate (7), which upper surface (36) extends on either side of the indentation (37) which is formed in the thickness of said baseplate (7), as shown in FIGS. 11 and 12.

The groove (39) of this indentation (37) serves as a passage region for the cleats (15) which project below the lower surface of the upper strand (6). The depth of the groove (39) is greater than the height of the cleats (15) and its width is significantly greater than the radial dimension of said cleats so as to allow the upper strand (6) of the belt to be mounted and demounted, account being taken of the presence of the guide means of said upper strand (6).

The means for guiding and vertically stabilizing this upper strand (6) are housed in the rebate (19) of the indentation (37). This rebate (19) extends on the inner side of the groove (39) below the level of the guide surface (36) for the upper strand (6); the depth of said rebate is around half the depth of the groove (39), and its width is of the same size.

The guide means are made up of rollers (17) in the form of simple ball-type bearings. These rollers (17) are mounted on pins (50) which are plugged into the various orifices (40) in the baseplate (7). These pins (50) have a shoulder (51) which ensures the vertical positioning of the rollers (17), each roller being mounted tightly on its pin (50).

The pin (50) is extended below the shoulder (51) and it has, at its lower end, a bulge (52) which allows it to be locked in its orifice (40), by wedging, after being force-fitted into the baseplate (7). This bulge (52) consists of a thickened portion which extends in the form of a cone over a length corresponding approximately to the radius of the pin (50).

The means for vertically stabilizing the upper strand (6), made up of the rail (21), are interposed between the bottom (23) of the rebate (19) and the shoulder (51) of the pin (50). The rail (21) is made up, as in the example represented in FIG. 4, of a bent metal strip which has holes (53) arranged opposite the orifices (40). These holes (53) have an oblong shape whose dimensions allow for the diameter of the pin (50) and for the difference which exists between the coefficient of expansion of said rail and that of the baseplate (7). Each hole (53) is 8.2 mm radially and 9.2 mm in the lengthwise direction, whereas the diameter of the bulge is 8 mm and that of the pin (50) in the region of the rail (21) is 7.3 mm; the shoulder (51) has a diameter of around 10 mm in order to cover the hole (53).

The runners (18) run on the various rollers (17), and the claws (24) associated with these various cleats (15) cooperate with the rail (21) so as to retain the upper strand (6) and prevent it from tilting in the event of an excessive load on the belt (2).

The baseplate (7) forms, together with the means for guiding and vertically stabilizing the belt, a kind of subassembly which can be readily integrated into a conveyor frame or structure.

The lower strand (9) of the belt (2) is likewise guided by means of a rail (54) which constitutes an equivalent structure to the means for guiding and stabilizing the upper strand (6).

This rail (54) has a thickness which corresponds to that of the roller (17), increased by the thickness of the shoulder (51) and that of the rail (21). It is supported by a profile (55) which is fastened to the crossmembers (46) by means of the bolts (48).

The profile (55) is in the form of a "U" having wings of unequal lengths arranged horizontally, and its lower wing supports the rail (54) via a spacer (56) and a bolt (57).

The lower strand (9) of the belt likewise rests on a guiding baseplate (not shown) supported by the flanks (12) of the conveyor frame.

The invention claimed is:

1. A modular endless belt conveyor comprising a structure, or frame, for supporting and guiding upper strand of a belt and a lower strands of said belt in curved path portions of the modular endless belt conveyor and, in particular, curvilinear guide means and stabilizing means for the upper strand, which curvilinear guide means are made up of rollers (17), uniformly distributed over said supporting structure, cooperating with cleats (15) which are arranged on an inner surface (16) of said belt, which cleats (15) have a claw (24) which cooperates with the stabilizing means suitable for stabilizing said upper strand of the belt, wherein said stabilizing means comprise a curved rail (21) which is arranged directly below said rollers (17) so as to cooperate with said claw (24) of each cleat (15).

2. The modular endless belt conveyor as claimed in claim 1, further comprising a structure for supporting the upper strand (6) of the belt, this structure being made up of a baseplate (7) produced, in the form of a circular ring portion, from a sheet of thermoplastic, which baseplate (7) has an indentation which is arranged as a curve in its thickness, in the vicinity of its outer rim, which indentation is made up of a groove (39) for the passage of the cleats (15) and of a rebate (19) for housing the means for guiding and stabilizing said upper strand (6) of the belt.

3. The modular endless belt conveyor as claimed in claim 2, wherein the curved rail (21) arranged below the rollers (17) takes the form of a thin metal strip which, like the baseplate (7), is configured as an arc of a circle, which curved rail (21) is arranged and fastened in the rebate (19) of the baseplate (7), and its outer rim projects into the groove (39) in which the cleats (15) travel.

4. The modular endless belt conveyor as claimed in claim 1, wherein each cleat (15) takes the form of a protrusion molded, in an integral manner, on the inner surface (16) of the belt (2), which protrusion comprises, on the one hand, a housing (27) for accommodating an add-on part in the form of a runner (18) arranged to run on the rollers (17), and, on the other hand, beyond said housing (27), an arrangement in the form of an angle bracket whose terminal branch forms a kind of claw (24) which cooperates with the curved rail.

5. The modular endless belt conveyor as claimed in claim 1, wherein the center-to-center distance between two adjacent rollers (17) is between 0.5 and 1.5 times the spacing which is present between two consecutive cleats (15) of the belt (2).

6. The modular endless belt conveyor as claimed in claim 4, wherein the runner (18) has a running wall (25) of trapezoidal shape whose height corresponds at least to the height of the rollers (17) and whose length is around ¾ of the spacing which is present between two cleats (15) of the belt (2).

7. The modular endless belt conveyor as claimed in claim 4, wherein the runner (18) comprises, behind the running wall (25), an integral protrusion in the form of a stub (26), which stub (26) fits into a suitable housing (27) which is formed in the cleat (15), and it is provided with means enabling it to be locked with respect to said cleat (15).

8. The modular endless belt conveyor as claimed in claim 7, wherein the means for locking the stub (26) of the runner (18) to the cleat (15) comprise a lug (31) in the form of a truncated cylinder which cooperates with an orifice (30) formed in a partition (29) of said cleat (15).

9. The modular endless belt conveyor as claimed in claim 8, wherein the partition (29) of the cleat (15) which allows the stub (26) of the runner (18) to be locked extends, on the one hand, between two flanks (28) of said body, which flanks are perpendicular to the inner surface (16) of the belt (2) and to its direction of movement, and it is prolonged, on the other hand, beyond the trapezoidal wall (25) of said runner, in the form of an angle bracket which is terminated by the claw (24).

10. A curved supporting structure for a conveyor as claimed in claim 1, further comprising a machined sheet of thermoplastic having a curved indentation (37) in its thickness, which indentation (37) comprises a groove (39) for the passage of the cleats (15) and a rebate for accommodating the rollers (17) for guiding the upper strand (6) of the belt and, arranged below said rollers, the curved rail (21) for stabilizing said upper strand (6) of the belt.

11. The curved supporting structure as claimed in claim 10, further comprising, in the rebate for housing the rollers (17) and the curved rail (21), orifices (40) arranged to accommodate the pins (50) of said rollers (17), each pin (50) having a shoulder (51) which is interposed between its roller (17) and the curved rail (21), said pin (50) being additionally provided, at its lower end, with a bulge (52) which allows it to be locked by force-fining in said orifice (40) and which allows the locking of said curved rail (21).

12. The curved supporting structure as claimed in claim 11, wherein the curved rail (21) is further provided with holes (53) of oblong shape which are arranged opposite the orifices (40) formed in the baseplate (7) on which the curved rail is locked, which holes (53) have dimensions which allow for the difference which exists between the coefficient of expansion of said curved rail and that of said baseplate (7).

13. An endless belt conveyor comprising:
an endless belt comprising:
a top surface for supporting and conveying objects;
a bottom surface;
at least one cleat extending downward from the bottom surface; and
a projection extending transversely from the at least one downward extending cleat;
a curvilinear guide comprising rollers configured to engage the at least one cleat, thereby guiding the belt in a horizontal direction;
a rail configured to engage the transverse projection of the at least one cleat, thereby stabilizing the belt in a vertical direction.

14. The endless belt conveyor of claim 13, wherein the rollers are disposed below the endless belt such that the rollers are configured to align with the cleat;
wherein the rail is disposed below the rollers such that the rail is configured to be positioned above the projection.

15. The endless belt conveyor of claim 13, wherein the cleat further comprises a detachable runner that contacts the rollers.

16. A modular endless belt conveyor comprising:
a modular endless belt comprising:
a top surface for supporting and conveying objects;
a bottom surface;
at least one cleat extending downward from the bottom surface; and
a projection extending transversely from the at least one downward extending cleat;
curvilinear guide means for engaging the at least one cleat to thereby guide the modular endless belt through a curved-path portion of the modular endless belt conveyor and reduce friction between the modular endless belt and a supporting structure;
stabilizing means for engaging the projection to thereby stabilize the modular endless belt in a vertical direction.

* * * * *